(12) United States Patent
Naujok et al.

(10) Patent No.: US 11,968,523 B2
(45) Date of Patent: Apr. 23, 2024

(54) SECURE CHANNEL FORMATION USING EMBEDDED SUBSCRIBER INFORMATION MODULE (ESIM)

(71) Applicant: Payfone, Inc., New York, NY (US)

(72) Inventors: Jeffrey Robert Naujok, Colorado Springs, CO (US); Rodger R. Desai, New York, NY (US); Michael Bijelich, New York, NY (US); Aditya Khurjekar, Princeton, NJ (US)

(73) Assignee: PROVE IDENTITY, INC., New York, NY (US)

( * ) Notice: Subject to any disclaimer, the term of this patent is extended or adjusted under 35 U.S.C. 154(b) by 131 days.

(21) Appl. No.: 17/407,041

(22) Filed: Aug. 19, 2021

(65) Prior Publication Data

US 2023/0054006 A1 Feb. 23, 2023

(51) Int. Cl.
| | | |
|---|---|---|
| *H04W 12/03* | (2021.01) | |
| *H04W 8/18* | (2009.01) | |
| *H04W 12/0431* | (2021.01) | |
| *H04W 12/50* | (2021.01) | |
| *H04W 12/60* | (2021.01) | |
| *H04W 12/72* | (2021.01) | |

(52) U.S. Cl.
CPC ............ *H04W 12/03* (2021.01); *H04W 8/18* (2013.01); *H04W 12/0431* (2021.01); *H04W 12/50* (2021.01); *H04W 12/66* (2021.01); *H04W 12/72* (2021.01)

(58) Field of Classification Search
CPC ... H04W 12/03; H04W 8/18; H04W 12/0431; H04W 12/50; H04W 12/66; H04W 12/72
See application file for complete search history.

(56) References Cited

U.S. PATENT DOCUMENTS

| | | |
|---|---|---|
| 7,644,434 B2 | 1/2010 | Pollutro |
| 8,606,640 B2 | 12/2013 | Brody |
| 10,693,872 B1 | 6/2020 | Larson et al. |
| 11,076,001 B1 | 7/2021 | Mohamad |

(Continued)

OTHER PUBLICATIONS

U.S. Appl. No. 17/183,208 / Patent Application filed Feb. 23, 2021, 61 pages, Doc 1803.

(Continued)

*Primary Examiner* — Mazda Sabouri
(74) *Attorney, Agent, or Firm* — Husch Blackwell LLP; Bryan D. Stewart

(57) ABSTRACT

Briefly, example methods, apparatuses, and/or articles of manufacture may be implemented, in whole or in part, to form a secure channel, such as between or among a communications device, a client computing resource, and/or an identity verifier. In particular embodiments, a method may include recognizing via a subscriber identifier, a known communications device within a communications network. The method may additionally include issuing an eSIM to the communications device via the communications network in response to recognizing the communications device and relating the eSIM to the subscriber identifier of the communications device. The method may further include, responsive to receipt of one or more signals from a client computing resource, utilizing encryption provided by the eSIM to form a secure channel between or among the communications device and an identity verifier.

21 Claims, 5 Drawing Sheets

(56) References Cited

U.S. PATENT DOCUMENTS

| | | |
|---|---|---|
| 11,165,586 B1 | 11/2021 | Rule et al. |
| 2008/0084870 A1 | 4/2008 | Taylor |
| 2008/0201401 A1 | 8/2008 | Pugh |
| 2010/0130169 A1 | 5/2010 | Narayanaswamy et al. |
| 2014/0053241 A1 | 2/2014 | Norrman et al. |
| 2015/0296379 A1 | 10/2015 | Nix |
| 2016/0105540 A1 | 4/2016 | Kwon |
| 2016/0277930 A1 | 9/2016 | Li et al. |
| 2017/0041964 A1 | 2/2017 | Yerli |
| 2019/0037401 A1 | 1/2019 | Egner et al. |
| 2019/0312878 A1 | 10/2019 | Brown et al. |
| 2019/0327609 A1 | 10/2019 | Schell et al. |
| 2020/0374694 A1* | 11/2020 | Fan ................ H04M 15/47 |
| 2020/0380598 A1 | 12/2020 | Spector |
| 2020/0412539 A1 | 12/2020 | Jy et al. |
| 2021/0029522 A1 | 1/2021 | Cao |
| 2021/0081632 A1 | 3/2021 | Batchu |
| 2021/0105142 A1 | 4/2021 | Lee et al. |

OTHER PUBLICATIONS

U.S. Appl. No. 17/183,208 / Filing Receipt dated Mar. 10, 2021, 3 pages, Doc 1804.
U.S. Appl. No. 17/183,208 / Non-final Office Action dated Jan. 14, 2022, 27 pages, Doc 1805.
U.S. Appl. No. 17/183,208 / Amendment filed Apr. 14, 2022, 23 pages, Doc 1806.
PCT/US22/16568 / PCT Application filed Feb. 16, 2022, 63 pages, Doc 1807.
PCT/US22/16568 / International Search Report and Written Opinion dated Mar. 4, 2022, 13 pages, Doc 1808.
U.S. Appl. No. 17/475,159 / Patent Application filed Sep. 14, 2021, 69 pages, Doc 1813.
U.S. Appl. No. 17/475,159 / Filing Receipt dates Sep. 27, 2021, 3 pages, Doc 1814.
U.S. Appl. No. 17/183,208 / Advisory Action dated Aug. 26, 2022, 8 pages, Doc 1854.
U.S. Appl. No. 17/183,208 / RCE & Response to Final Office Action dated Sep. 8, 2022, 30 pages, Doc 1855.
U.S. Appl. No. 17/183,208 / Non-final Office Action dated Oct. 4, 2022, 29 pages, Doc 1856.
U.S. Appl. No. 17/183,208 / Response to Non-Final Office Action filed Jan. 9, 2023, 25 pages, Doc 1869.
PCT Application No. PCT/US22/16568 / Demand & Response to Written Opinion filed Dec. 22, 2022, 31 pages, Doc 1880.
PCT Application No. PCT/US22/39174 / PCT Application filed Aug. 2, 2022, 65 pages, Doc 1870.
PCT Application No. PCT/US22/39174 / International Search Report and Written Opinion dated Dec. 6, 2022, 13 pages, Doc 1871.
U.S. Appl. No. 17/183,208 / Final Office Action dated Jun. 9, 2022, 29 pages, Doc 1843.
U.S. Appl. No. 17/183,208 / Response to Final Office Action dated Aug. 1, 2022, 25 pages, Doc 1844.
U.S. Appl. No. 17/183,208 / Final Office Action dated Mar. 9, 2023, 37 pages, Doc 1901.
BR Application No. 1120230168767 / Brazil Application filed Aug. 22, 2023, 39 pages, Doc 1952.
CA Application No. 3209181 / Canada Application filed Aug. 21, 2023, 75 pages, Doc 1953.
EP Application No. 22760222.4 / European Application filed Aug. 21, 2023, 6 pages, Doc 1954.
IN Application No. 202347056479 / India Application filed Aug. 23, 2023, 59 pages, Doc 1955.

\* cited by examiner

SECURE CHANNEL FORMATION USING EMBEDDED SUBSCRIBER INFORMATION MODULE (ESIM)

BACKGROUND

1. Field

The present disclosure relates generally to eSIM technology to perform, for example, authentication of subscribers co-located with communications devices and, in addition, to creation of secure channels between or among communications devices and third parties.

2. Information

The World Wide Web, or simply the Web, has grown rapidly in recent years at least partially in response to the relative ease by which a wide variety of transactions can be performed or facilitated via the Internet. As a consequence of widely available Internet connections, including connections to the Internet facilitated by mobile cellular communications devices and services, for example, a mobile subscriber may shop and/or browse for virtually any product or service utilizing a communications device. However, in such an environment, in which electronic- and/or Internet-based commerce has become increasingly common, occurrences of fraud and deception, unfortunately, can also occur. To reduce the instances of fraud and deception, fraud-protection processes and/or procedures may be implemented. Such implementations may be utilized, for example, in connection with everyday online or electronic transactions, which may include financial transactions, establishment of lines of credit, purchases for goods and/or services, or the like.

As devices typically utilized for communicating and/or performing Internet-based electronic transactions, such as smart phones, tablet computing devices, laptop computers, etc., become increasingly sophisticated, techniques for accomplishing fraud utilizing such devices have also become more sophisticated. Techniques for accomplishing fraud may involve use of and/or knowledge of complex technology, for example, which may be related to the particular hardware and/or software platforms associated with such smart phones, tablets, laptop computers, etc. Thus, attempts to reduce the instances of fraud and deception, which may involve, for example, use of various electronic devices, continues to be an active area of investigation.

SUMMARY

One general aspect includes a method of forming a secure communications channel with a communications device, including recognizing, via a subscriber identifier, the communications device as a known communications device within a communications network. The method also includes issuing an eSIM to the communications device via the communications network in response to recognizing the communications device. The method also includes relating the eSIM to the subscriber identifier of the communications device. The method also includes, responsive to receipt of one or more signals from a client computing resource, utilizing encryption provided by the eSIM to form a secure channel between or among the communications device and an identity verifier.

In particular embodiments, recognizing the communications device includes the identity verifier accessing one or more memory devices to obtain one or more historical or behavioral parameters corresponding to the communications device. In particular embodiments, the one or more historical or behavioral parameters correspond to a trustworthiness metric of the communications device. Particular embodiments may additionally include receiving, prior to issuing the eSIM to the communications device, one or more signals via the communications network, the one or more signals being generated responsive to the communications device obtaining parameters from a machine-readable code. In particular embodiments, the machine-readable code corresponds to an optically-readable code, a code operating in a radiofrequency domain, or a combination thereof. In particular embodiments, recognizing the communications device includes receiving a mobile telephone number or one or more parameters assigned to the eSIM. In particular embodiments, the secure channel corresponds to a wireless fidelity (Wi-Fi) channel. In particular embodiments, the method may further include transmitting a key and an endpoint identifier to the communications device over the secure channel. In particular embodiments, the method may also include transmitting, to the client computing resource, one or more historical or behavioral parameters corresponding to the communications device and the key. In particular embodiments, the method may further include transmitting a key and an endpoint identifier to the communications device over the secure channel. In particular embodiments, the method may include transmitting a first key portion to the communications device. In particular embodiments, the method may include transmitting a second key portion to the client computing resource. In particular embodiments, the method may also include the first key portion being used by the communications device to digitally sign a transaction. In particular embodiments, the method may also include the second key portion being used by the client computing resource to validate the transaction. In particular embodiments the method may also include requesting, via the client computing resource, an eSIM-encrypted push notification for transmitting to the communications device.

Another general aspect includes an apparatus to form a secure communications channel with a communications device, including at least one processor coupled to at least one memory device to recognize, via a subscriber identifier, the communications device as a known communications device within a communications network. The at least one processor coupled to the at least one memory are additionally to issue an eSIM to the communications device via the communications network in response to recognizing the communications device. The at least one processor coupled to the at least one memory are additionally to utilize, responsive to receipt of one or more signals from a client computing resource, encryption provided by the eSIM to form a secure channel between or among the communications device and an identity verifier.

In particular embodiments, the at least one processor coupled to the at least one memory device are additionally to access, by the identity verifier, the at least one memory device to obtain one or more historical or behavioral parameters corresponding to the communications device. In particular embodiments, the one or more historical or behavioral parameters are to correspond to a trustworthiness metric of the communications device. The at least one processor coupled to the at least one memory device are additionally to receive, prior to issue of the eSIM to the communications device, one or more signals via the communications network, the one or more signals to be generated responsive to the communications device obtaining parameters from a machine-readable code. In particular embodiments, the secure channel is to correspond to a wireless fidelity (Wi-Fi) channel. In particular embodiments, the processor coupled to the at least one memory are additionally to transmit a key and an endpoint identifier to the communications device over the secure channel. In particular embodiments, the at least one processor coupled to the at least one memory are also to transmit one or more historical or behavioral parameters corresponding to the communications device, as well as the key, to the client computing resource. In particular embodiments, the at least one memory device are additionally to transmit a key and an endpoint identifier to the communications device over the secure channel. In particular embodiments, the at least one processor coupled to the at least one memory are also to transmit a first key portion to the communications device. In particular embodiments, the at least one processor coupled to the at least one memory may also be to transmit a second key portion to the client computing resource. In particular embodiments, the at least one processor coupled to the at least one memory may additionally be to include the first key portion for use by the communications device to digitally sign a transaction. In particular embodiments, the at least one processor coupled to the at least one memory may additionally be to include the second key portion for use by the client computing resource to validate the transaction. In particular embodiments, the at least one processor coupled to the at least one memory are additionally to request, via the client computing resource, an eSIM-encrypted push notification for transmitting to the communications device.

Another general aspect includes an article having a non-transitory storage medium having instructions stored thereon executable by a special-purpose computing platform to recognize, via a subscriber identifier, a communications device as a known communications device within a communications network. The encoded instructions may also be to issue an eSIM to the communications device via the communications network in response to recognizing the communications device. The encoded instructions may also be to utilize encryption provided by the eSIM to form a secure channel between or among the communications device and an identity verifier responsive to receipt of one or more signals from a client computing resource. The encoded instructions may additionally be to transmit a key and an endpoint identifier to the communications device over the secure channel. The encoded instructions may additionally be to transmit, to the client computing resource, one or more historical or behavioral parameters corresponding to the communications device and the key.

In particular embodiments, the encoded instructions are additionally to transmit a key and an endpoint identifier to the communications device over the secure channel. In particular embodiments, the encoded instructions may operate to transmit a first key portion to the communications device. In particular embodiments, the encoded instructions may additionally operate to transmit a second key portion to the client computing resource. In particular embodiments, the first key portion is to be used by the communications device to digitally sign a transaction. In particular embodiments, the second key portion is to be used by the client computing resource to validate the transaction. In particular embodiments, the instructions executable by the special-purpose computing platform are additionally to request, via the client computing resource, an eSIM-encrypted push notification to transmit to the communications device.

BRIEF DESCRIPTION OF THE DRAWINGS

Claimed subject matter is particularly pointed out and distinctly claimed in the concluding portion of the specification. However, both as to organization and/or method of operation, features, and/or advantages thereof, it may best be understood by reference to the following detailed description if read with the accompanying drawings in which:

Figure 1:
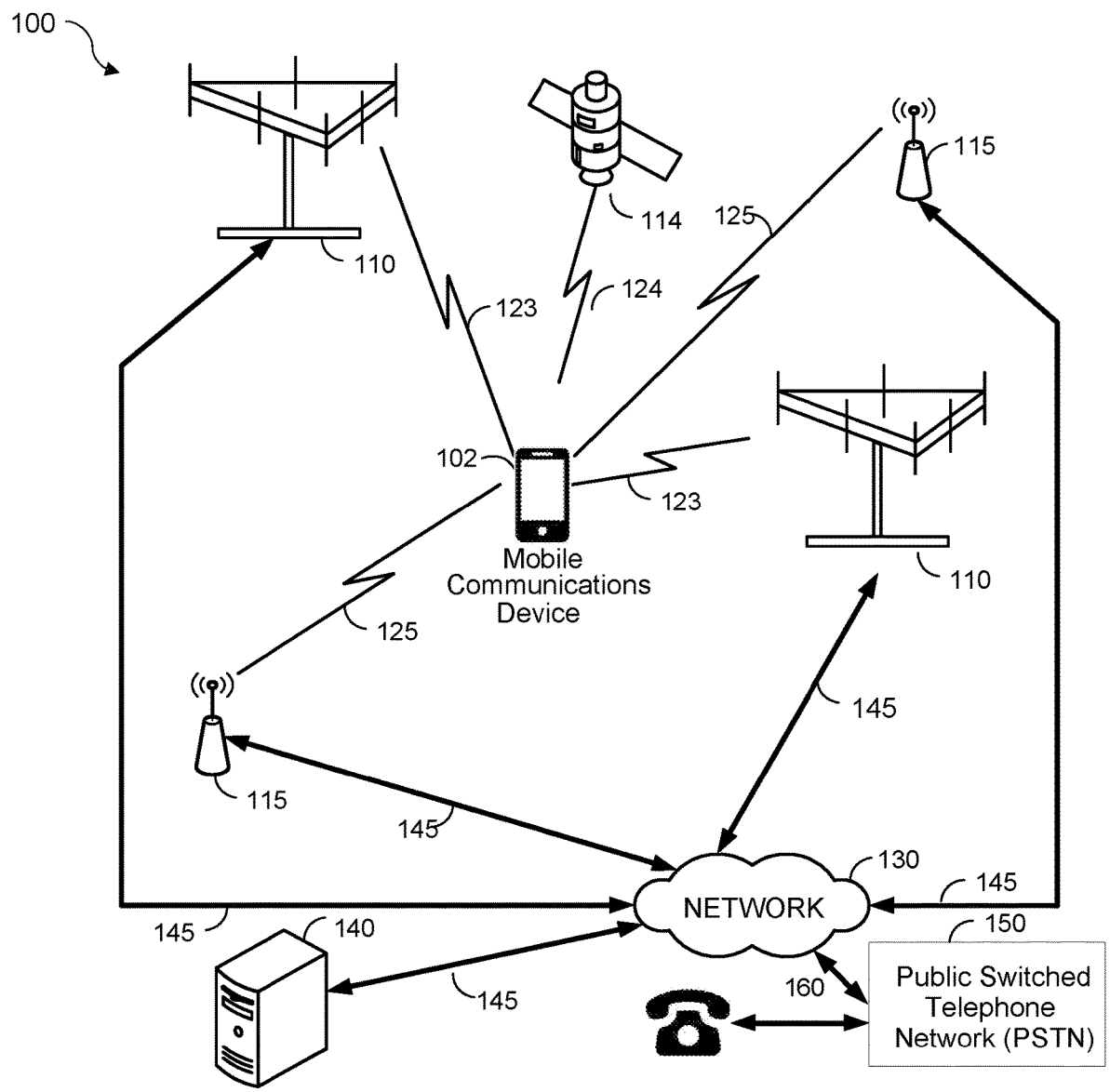
FIG. 1 is a diagram of a communications infrastructure, according to various embodiments.

Reference is made in the following detailed description to the accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others, one or more aspects, properties, etc. may be omitted, such as for ease of discussion, or the like. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification, are not necessarily intended to refer to the same implementation and/or embodiment or to any one particular implementation and/or embodiment. Furthermore, it is to be understood that particular features, structures, characteristics, and/or the like described, are capable of being combined in various ways in one or more implementations and/or embodiments and, therefore, are within intended claim scope. In general, of course, for the specification of a patent application, these and other issues have a potential to vary in a particular context of usage. In other words, throughout the disclosure, particular context of description and/or usage provides guidance regarding reasonable inferences to be drawn; however, likewise, the term "in this context" in general without further qualification refers at least to the context of the present patent application.

As previously alluded to, in an environment in which electronic communications devices, such as mobile cellular communications devices, voice over Internet protocol (VoIP) communications devices, etc., are ubiquitous, a user of an electronic communications device may wish to perform an electronic or digital transaction. Such transactions may involve completing an application for credit, electronically signing a document, initiating an electronic financial transaction, purchasing a product and/or service, completing a loan application, completing of one or more forms involved with applying for healthcare coverage (such as in connection with visiting a health provider's office), and/or engaging in a number of other types of transactions via an electronic communications device (or, more simply, a "communications device"). To facilitate these types of transactions, for example, a subscriber co-located with (or at least proximate with) a communications device may establish an identity, such as may be established in connection with a communications device subscriber account with a cellular or mobile communications services carrier, a VoIP services provider, or other type of communication services carrier. Establishment of an account associated with a communications device, utilizing, for example, a subscriber account identifier (e.g., a cellular telephone number), may permit an individual attempting to engage in an electronic or digital transaction to be authenticated, authorized, and/or verified. In some instances, in view of the nature of electronic or digital transactions, such as in an environment in which electronic or digital transactions are initiated via a communications network at any time and at any location, it may be useful to verify and/or authenticate a user relatively quickly, such as in real-time, for example.

As a general matter, verification of possession of a communications device by a transacting party, such as a party proximate or even co-located with a communications device, may be desirable for a number of reasons. Such reasons may include a client institution or organization (e.g., a financial institution, a brokerage, a healthcare provider, etc.) seeking to determine and/or to prove identity of the transacting party (e.g., a mobile subscriber) or perhaps to secure a digital signature from a transacting party. Proving a transacting party's possession of a communications device, for example, may involve establishing a correspondence between the transacting party and a subscriber account identifier. In this context, correspondence, association, and/or similar terms refer to a persistent, continuing, and objectively verifiable relationship between the transacting party in possession of, for example, a particular communications device, such as a mobile communications device. Thus, a unique subscriber account identifier may be employed to signify and/or identify a particular transacting party. In this context, the term "communications device identity" and/or a similar term refers to an identity that leverages a mobile communications device account relationship (also referred to as a correspondence and/or association) of a subscriber as a tool for authentication, authorization, and/or verification of a transacting party. Also in this context, the term "mobile subscriber device account" and/or a similar term refers to a mobile communication services provider account. The terms "communications services carrier," "mobile communications carrier," and "mobile network operator" may be used interchangeably. Furthermore, in this context, the term "mobile services carrier" and "communication services carrier" may refer to an entity of a communications infrastructure that provides wired and/or wireless communication services to the general public for a consideration, such as a monthly subscription fee.

It should be noted that while the term "communication services carrier" may refer to a mobile communication services provider and/or mobile network operator, there are examples of carriers that do not correspond to mobile communications device services providers and/or mobile network operators. Such instances may include wireline services providers (for example, providers of services operating within the public switched telephone network or PSTN), which include wireline services for rotary dial telephones and/or telephones utilizing, for example, dual tone multi-frequency (DTMF) signaling.

Other aspects of verifying and/or authenticating a mobile subscriber, such as by way of proving that a mobile subscriber is in possession of (or at least co-located with) a communications device, are also described in greater detail hereinbelow. For example, in an embodiment, verifying the identity of and/or authenticating a transacting party may relate to a mobile account and/or a mobile subscriber. Further, a mobile subscriber account is one example of a type of subscriber account, especially in a networked electronic commerce environment, although claimed subject matter is not intended to be limited to online accounts or to mobile accounts. Rather, the term "account" or "subscriber account" in this context refers to a formal business arrangement between an entity, a person, or other party seeking to engage in a transaction, and a provider of the account, so as to accomplish a business purpose, for example. Thus, the term "account" is intended to be broadly interpreted as an arrangement that may provide certain privileges. In this context, privileges may involve access to credit, so as to facilitate the purchase of goods or services, access to privileged content, such as premium entertainment content (e.g., premium sports, cinema, or other entertainment content). Also in this context, the term "privileged content" is intended to be interpreted broadly so as to encompass any type of content available exclusively to certain individuals and/or certain entities in response to supplying certain credentials. Also in this context the term "parameters" refers numerical or other deterministic, measurable factors capable of defining a system and/or to set conditions for operation of a system. Thus, for example, a set of parameters may include parameters stored via a non-transitory memory that forms or defines, at least in part, an electronic representation of the state of a mobile subscriber.

Likewise, an account may comprise various attributes. In this context, the term "subscriber account identifier" refers to a unique descriptor or feature associated with the account that defines certain aspects of the account. For example, in nonlimiting illustrations, a subscriber account identifier may refer to (or may at least be associated with) a mobile telephone number, a mobile subscriber unique alias, an international mobile subscriber identifier (IMSI), Integrated Circuit Card Identifier (ICC ID), a mobile services and/or other type of identifier (e.g., a unique identifier) employed in connection with the particular mobile network operator or the mobile communication services provider. Mobile communications networks may include those compatible or compliant with a Global System for Mobile Communications (GSM) telecommunications network, for example.

Other examples of mobile subscriber account identifiers may include an International Mobile Equipment Identifier (IMEI), Mobile Station International Subscriber Directory Number (MSISDN), a mobile equipment identifier, or any other identifier that may be utilized to identify a mobile billing account.

As discussed herein, a subscriber co-located with, or in possession of, a communications device may apply for an account, such as a credit account, for example, or may apply for any other type of account that imparts or confers particular privileges on the subscriber co-located or in possession of the communications device. In other instances, a subscriber co-located with a mobile device may attempt to engage in a financial transaction, for example, or may attempt to access privileged information/privileged content, just to name a few examples. In many instances, to obtain a privilege, such as access to credit, access to privileged information (e.g., premium content streaming or other entertainment) a mobile subscriber may be required to complete an application, such as an application for an account, an application for credit, an application for an increase in credit, or may be required to make another type of formal request, which involves the subscriber supplying subscriber-specific parameters. However, as previously alluded to, it may be advantageous for the subscriber, and for the institution providing privileges to the subscriber, for example, to verify or prove that, indeed, the subscriber is co-located with (or is in possession of) a particular communications device. By proving possession of a particular communications device, an institution may reduce the risk of a subscriber engaging in fraudulent behavior by impersonating a particular mobile subscriber and/or by obtaining another subscriber's mobile phone, such as by theft or by any other type of unscrupulous behavior.

Thus, in particular embodiments, proving possession of a communications device may reduce the likelihood of an unscrupulous individual completing fraudulent financial transactions, such as transactions involving credit applications, increases in credit lines, purchases, asset sales, access to premium content, or the obtaining of any other type of privileges via fraud and/or deception. In particular embodiments, proving possession of a communications device may involve initiating a browser session via the communications device, in which the device is directed to connect or establish contact with an identity verifier via a resource locator, such as a uniform resource locator (URL). During such a browser session, which may be initiated by a subscriber in possession of or co-located with a particular communications device, an application program, executing by way of a processor coupled to at least one memory of the communications device, may obtain, access, and/or derive specific communications device parameters, without user input, from memory elements within the device. Communications device parameters may comprise those accessed from a subscriber identity module (SIM), eSIM, or from any other memory or parameter storage location accessible by a processor of the communications device. In some instances, by way of obtaining parameters stored in a SIM or eSIM of the communications device, for example, under the direction of a browser program operating on the device, an identity verifier can be assured that the subscriber operating the communications device is, indeed, in possession of the particular communications device. A resource locator (e.g., a URL) utilized during a browser session may comprise parameters uniquely identifying a transaction, thereby preventing the resource locator from being reused, for example, such as by an unscrupulous individual attempting to fraudulently engage in, for example, a financial transaction.

Responsive to an identity verifier having proved that an assumed or purported subscriber is, indeed, in possession of a particular communications device, a financial institution, for example, may be confident that a verified and/or authenticated individual is attempting to engage in a transaction. Conversely, in response to an identity verifier determining that an assumed or purported subscriber is likely not in possession of a particular communications device (or cannot be proven to be in possession of a particular communications device), a financial institution, for example, may elect to terminate a financial transaction, for example.

Further, an identity verifier may utilize parameters obtained from a specific communications device to access one or more records relating to historical events with respect to the particular communications device. In particular embodiments, records relating to historical events relative to the particular communications device may be indicative of the reputation of the communications device. Thus, responsive to an identity verifier obtaining records relating to historical events relevant to the particular communications device, the identity verifier may report a measure of trust or trustworthiness with respect to a particular communications device. In some instances, a financial institution, for example, may utilize measures of trust or trustworthiness of a particular communications device to influence and/or inform whether particular transactions should be permitted to take place. For example, responsive to an identity verifier reporting a relatively low measure of trust or trustworthiness with respect to a communications device, a financial institution, for example, may permit only low-value transactions (e.g., less than $100) to take place. In another example, responsive to an identity verifier reporting a relatively high measure of trust or trustworthiness with respect to a particular communications device, a financial institution may permit transactions of virtually any value to take place.

In accordance with particular embodiments, formation of a secure channel using a SIM or an eSIM may prevent unscrupulous individuals, for example, who might be impersonating the owner of a particular communications device, from completing a fraudulent financial transaction. In many instances, precluding unscrupulous individuals from completing fraudulent financial transactions, such as via impersonating a particular communications device account holder or subscriber, operates to protect authentic account holders as well as financial institutions, content providers, healthcare institutions, and so forth. In addition, as a consequence of an identity verifier authenticating a particular subscriber, such as by way of verifying possession of a specific communications device, the identity verifier may report a measure of trust and/or trustworthiness of a particular communications device to a financial institution. By way of reporting trust and/or trustworthiness to a financial institution, certain types of transactions may be permitted to occur while other types of transactions may be disallowed. Preventing occurrence of fraudulent transactions may bring about a reduction in instances of identity theft, fraud related to credit cards and/or other instruments, circumventing of parental controls, pirating of exclusive entertainment content, forging of digital signatures, and so forth.

In particular embodiments, formation of a secure channel using an eSIM of a communications device may involve a subscriber (assumed to be in possession of the communications device) contacting a client computing resource operating under the control and/or the direction of, for example, an institution (e.g., a financial institution, a real estate title company, a healthcare provider, a content provider, etc.). In particular embodiments, the client computing resource, perhaps operating in accordance with business rules and/or business logic implemented by a financial institution, may facilitate and/or support identity verification and/or authentication prior to permitting certain types of transactions to occur. Accordingly, in response to the subscriber contacting the institution, the client computing resource may communicate with an identity verifier, who may operate to prove that a particular subscriber is, indeed, in possession of (or at least proximate with) a specific mobile communications device. Such proof may enable the identity verifier to verify, authorize, and/or audit the identity of the subscriber. As a part of a process to authenticate, verify, and/or authorize a transaction involving the subscriber, the client computing resource of the institution may participate in directing the communications device to establish a connection, such as via the Internet, with a website, for example, corresponding to (or under the control of) an identity verifier. In turn, the identity verifier may initiate a browser session directly with the communications device so as to facilitate session-based communications between the identity verifier and the communications device.

Following establishment of a browser-based session between the identity verifier and the communications device, the identity verifier may direct the communications device to obtain, for example, specific device parameters stored at memory locations within the communications device. In an embodiment, in response to receiving one or more queries from the identity verifier, the communications device may access a SIM, eSIM and/or other memory device(s) of the communications device to determine or obtain the specific device parameters. Specific device parameters may be encoded and forwarded to the identity verifier. The identity verifier may utilize the specific device parameters to permit comparison of the device parameters with corresponding parameters stored in a data store accessible to the identity verifier. Responsive to agreement or a match between parameters from the communications device and parameters obtained from the data store, the identity verifier may prove the identity of and/or authenticate the subscriber operating the particular communications device. Conversely, responsive to the identity verifier being unable to match the device parameters with corresponding parameters stored in a data store, the identity verifier returns an indication of an inability to match the stored parameters with the device parameters.

In particular embodiments, proving the identity of the subscriber and/or authenticating the subscriber may operate to form a bind between the communications device and the identity verifier. Thus, in response to the communications device subsequently contacting the identity verifier, the identity verifier may recognize the communications device as a known and/or previously authenticated communications device. Thus, in this context, "recognizing" a communications device refers to an identity verifier, for example, determining that an identifier, such as a mobile telephone number, IMEI, MSISDN, IMEI, ICC ID, mobile subscriber unique alias, or any other descriptor that corresponds to a communications device for which deterministic, historical and/or behavioral parameters, with respect to the device, are known by (or accessible to) the identity verifier.

In particular embodiments, after forming a bind between a communications device and an identity verifier, the identity verifier may issue an eSIM to the communications device, which may be installed into memory under the control of an operating system of the communications device. The eSIM permits communications between the identity verifier and the communications device to be encrypted in accordance with typical eSIM encryption techniques. Thus, at least in particular embodiments, the identity verifier may operate, at least to some extent, as a virtual network operator (e.g., a mobile virtual network operator). It should be noted, however, that although an identity verifier may issue an eSIM to a communications device, such issuance of an eSIM may not, at least in particular embodiments, bring about a change in the communication services carrier providing services to the device. Accordingly, at least in some instances, inbound and outbound call processing, inbound and outbound text message processing, billing, and other services remain with an existing communication services carrier. Thus, at least in particular embodiments, an identity verifier may operate to establish a relationship or correspondence between a subscriber identifier, such as a mobile telephone number, and the identity verifier. Such a relationship or correspondence between a subscriber identifier and an identity verifier may operate to permit encryption, utilizing the eSIM issued to the communications device, of communications between the identity verifier and the communications device.

It may be appreciated that in response to an identity verifier issuing an eSIM to a communications device, a secure channel may be formed between the communications device and the identity verifier. The secure channel may be utilized, for example, to transmit cryptographic security keys and/or portions of such security keys, which may facilitate digital signature of documents transmitted between a client computing resource, for example, and a communications device. Cryptographic security keys (or portions thereof) transmitted between a client computing resource and a communications device may also facilitate secure push notifications transmitted from the client computing resource and the computing device. As will be detailed hereinbelow, secure communications between a client computing resource and a communications device may be conducted via a cellular communications channel, a Wi-Fi communications channel, or other type of communications channel, and claimed subject matter is not limited in this respect. Issuance of an eSIM may represent a one-time occurrence, such as during initial stages of a financial transaction, and may be repeatedly re-used in conducting subsequent financial transactions. Further, as previously mentioned, although eSIM encryption may be utilized in securing a channel between a communications device and an identity verifier, a subscriber may be capable of maintaining an existing relationship with a communication services provider.

Having described benefits of particular embodiments of claimed subject matter, FIG. 1 shows a diagram of a communications infrastructure, according to various embodiments. In FIG. 1 (embodiment 100) communications device 102 may transmit radio signals to, and receive radio signals from, a wireless communications network. In an example, communications device 102 may communicate with a cellular communications network by transmitting wireless signals to, and/or receiving wireless signals from, a cellular transceiver 110, which may comprise a wireless base transceiver subsystem (BTS), a Node B or an evolved NodeB (eNodeB), over wireless communication link 123. Similarly, communications device 102 may transmit wireless signals to, and/or receive wireless signals from, local transceiver 115 over wireless communication link 125. A local transceiver 115 may comprise a Wi-Fi access point (AP), a femtocell, a Home Base Station, a small cell base station, a Home Node B (HNB) or a Home eNodeB (HeNB)

and may provide access to a wireless local area network (WLAN, e.g., IEEE 802.11 network), a wireless personal area network (WPAN, e.g., Bluetooth® network) or a cellular network (e.g. an LTE network or other wireless wide area network, such as those discussed herein). Of course, it should be understood that these are merely examples of networks that may communicate with a mobile device over a wireless link, and claimed subject matter is not limited in this respect. In particular embodiments, cellular transceiver 110, local transceiver 115, satellite 114, and PSTN 150 represent touchpoints, which permit communications device 102 to interact with network 130.

Examples of network technologies that may support wireless communication link 123 are GSM, Code Division Multiple Access (CDMA), Wideband CDMA (WCDMA), Long Term Evolution LTE), High Rate Packet Data (HRPD). GSM, WCDMA and LTE are technologies defined by 3GPP. CDMA and HRPD are technologies defined by the $3^{rd}$ Generation Partnership Project 2 (3GPP2). WCDMA is also part of the Universal Mobile Telecommunications System (UMTS) and may be supported by an HNB. Cellular transceivers 110 may comprise deployments of equipment providing subscriber access to a wireless telecommunication network for a service (e.g., under a service contract). In the embodiment of FIG. 1, a cellular transceiver 110 may perform functions of a cellular base station in servicing subscriber devices within a cell determined based, at least in part, on a range at which the cellular transceiver 110 is capable of providing access service. Examples of radio technologies that may support wireless communication link 125 are IEEE 802.11, BT and LTE.

In a particular implementation, cellular transceiver 110 and local transceiver 115 may communicate with server 140, such as by way of network 130 via communication links 145. Here, network 130 may comprise any combination of wired or wireless links and may include cellular transceiver 110 and/or local transceiver 115 and/or server 140. In a particular implementation, network 130 may comprise Internet Protocol (IP) or other infrastructure capable of facilitating communication between communications device 102 at a call source and server 140 through local transceiver 115 or cellular transceiver 110. In an embodiment, network 130 may also facilitate communication between communications device 102, server 140 and a PSTN 150, for example through communications link 160. In another implementation, network 130 may comprise a cellular communication network infrastructure such as, for example, a base station controller or packet based or circuit based switching center (not shown) to facilitate mobile cellular communication with communications device 102. In a particular implementation, network 130 may comprise local area network (LAN) elements such as Wi-Fi APs, routers and bridges and may, in such an instance, comprise links to gateway elements that provide access to wide area networks such as the Internet. In other implementations, network 130 may comprise a LAN and may or may not involve access to a wide area network but may not provide any such access (if supported) to communications device 102. In particular embodiments, network 130 may comprise multiple networks (e.g., one or more wireless networks and/or the Internet). For example, network 130 may include one or more serving gateways or Packet Data Network gateways. In addition, one or more of server 140 may comprise an E-SMLC, a Secure User Plane Location (SUPL) Location Platform (SLP), a SUPL Location Center (SLC), a SUPL Positioning Center (SPC), a Position Determining Entity (PDE) and/or a gateway mobile location center (GMLC), each of which may connect to one or more location retrieval functions (LRFs) and/or mobility management entities (MMEs) of network 130.

In particular embodiments, communications between communications device 102 and cellular transceiver if 110, satellite 114, local transceiver 115, and so forth may occur utilizing signals communicated across wireless communications channels. Accordingly, the term "signal" may refer to communications utilizing propagation of electromagnetic waves across wireless communications channels. Signals may be modulated to convey messages utilizing one or more techniques such as amplitude modulation, frequency modulation, binary phase shift keying (BPSK), quaternary phase shift keying (QPSK) along with numerous other modulation techniques, and claimed subject matter is not limited in this respect. Accordingly, as used herein, the term "messages" refers to parameters, such as binary signal states, which may be encoded in a signal using one or more of the above-identified modulation techniques.

In particular implementations, and as discussed below, communications device 102 may comprise circuitry and processing resources capable of obtaining location related measurements (e.g. for signals received from GPS or other Satellite Positioning System (SPS) satellites 114), cellular transceiver 110 or local transceiver 115 and possibly computing a position fix or an estimated location of communications device 102 based on these location-related measurements. In some implementations, location-related measurements obtained by communications device 102 may be transferred to a location server such as an enhanced serving mobile location center (E-SMLC) or SUPL location platform (SLP) (e.g. which may comprise a server, such as server 140) after which the location server may estimate or determine an estimated location for communications device 102 based on such measurements. In the presently illustrated example, location-related measurements obtained by communications device 102 may include measurements of signals (124) received from satellites belonging to an SPS or Global Navigation Satellite System (GNSS) such as GPS, GLONASS, Galileo or Beidou and/or may include measurements of signals (such as 123 and/or 125) received from terrestrial transmitters fixed at known locations (e.g., such as cellular transceiver 110).

Communications device 102 or a separate location server may obtain a location estimate for communications device 102 based on location related measurements using any one of several position methods such as, for example, GNSS, Assisted GNSS (A-GNSS), Advanced Forward Link Trilateration (AFLT), Observed Time Difference Of Arrival (OTDOA) or Enhanced Cell ID (E-CID) or combinations thereof. In some of these techniques (e.g. A-GNSS, AFLT and OTDOA), pseudoranges or timing differences may be measured at communications device 102 relative to three or more terrestrial transmitters fixed at known locations or relative to four or more satellites with accurately known orbital data, or combinations thereof, based at least in part, on pilots, positioning reference signals (PRS) or other positioning related signals transmitted by the transmitters or satellites and received at communications device 102. Here, server 140 may be capable of providing positioning assistance data to communications device 102 including, for example, information regarding signals to be measured (e.g., signal timing), locations and identities of terrestrial transmitters and/or signal, timing and orbital information for GNSS satellites to facilitate positioning techniques such as A-GNSS, AFLT, OTDOA and E-CID. For example, server 140 may comprise an almanac to indicate locations and identities of cellular transceivers and/or local transceivers in a particular region or regions such as a particular venue, and may provide information descriptive of signals transmitted by a cellular base station or AP such as transmission power and signal timing. In the case of E-CID, communications device 102 may obtain measurements of signal strengths for signals received from cellular transceiver 110 and/or local transceiver 115 and/or may obtain a round trip signal propagation time (RTT) between communications device 102 and a cellular transceiver 110 or local transceiver 115. If A communications device 102 may use these measurements together with assistance data (e.g. terrestrial almanac data or GNSS satellite data such as GNSS Almanac and/or GNSS Ephemeris information) received from server 140 to determine a location estimate for communications device 102 or may transfer the measurements to server 140 to perform the same determination. A call from communications device 102 may be routed, based on the location of communications device 102, and connected to PSTN 150, for example, via wireless communication link 123 and communications link 160.

A mobile device at a call source (e.g., communications device 102 of FIG. 1) may be referred to by any name corresponding to a cellphone, smartphone, laptop, tablet, PDA, tracking device or some other portable or movable device. Typically, though not necessarily, a mobile device may support wireless communication such as using GSM, WCDMA, LTE, CDMA, HRPD, Wi-Fi, BT, WiMax, etc. A mobile device may also support wireless communication using a wireless LAN (WLAN), DSL or packet cable for example. A mobile device may comprise a single entity or may comprise multiple entities such as in a personal area network where a user may employ audio, video and/or data I/O devices and/or body sensors and a separate wireline or wireless modem. An estimate of a location of a mobile device (e.g., communications device 102) may be referred to as a location, location estimate, location fix, fix, position, position estimate or position fix, and may be geographic, thus providing location coordinates for the mobile device (e.g., latitude and longitude) which may or may not include an altitude component (e.g., height above sea level, height above or depth below ground level, floor level or basement level).

The architecture of the communications network described in relation to FIG. 1 may comprise a generic architecture that is capable of accommodating a variety of outdoor and indoor location solutions including the standard SUPL user plane location solution defined by the Open Mobile Alliance (OMA) and standard control plane location solutions defined by 3GPP and 3GPP2. For example, server 140 may function as (i) a SUPL location platform to support the SUPL location solution, (ii) an E-SMLC to support the 3GPP control plane location solution with LTE access on wireless communication link 123 or 125, or (iii) a Standalone Serving Mobile Location Center (SAS) to support the 3GPP Control Plane Location solution for UMTS.

Figure 2:
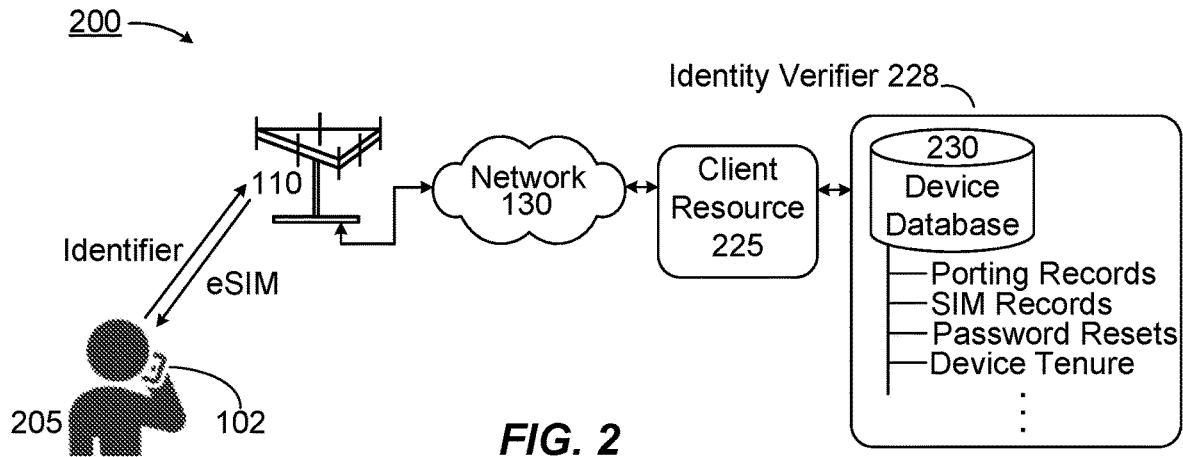
FIG. 2 shows a subscriber in possession of a communications device to permit interaction with a client computing resource and an identity verifier, according to an embodiment.

In view of the communications infrastructure shown and described in reference to FIG. 1, more particular embodiments directed toward forming a secure channel using an eSIM are discussed hereinbelow. Thus, FIG. 2 shows a subscriber in possession of communications device 102, which may permit communication between and/or among the device, a client computing resource, and an identity verifier, according to an embodiment 200. In the embodiment of FIG. 2, mobile subscriber 205, co-located or at least proximate with communications device 102, may be located at any point within communications range of cellular transceiver 110. As shown in FIG. 2, communications device 102 may communicate with client computing resource 225 via network 130 coupled to cellular transceiver 110. It should be noted, however, that claimed subject matter is not limited exclusively to wireless communications between device 102 and cellular transceiver 110. For example, in particular embodiments, communications device 102 may communicate with client computing resource 225 by way of one or more intervening Wi-Fi or wireline telephone services (e.g., the PSTN).

Subscriber 205, utilizing a communications device 102, may attempt to engage in a financial transaction via client computing resource 225. Client computing resource 225 may represent or may signify a bank (or other type of financial institution), a real estate title company, a healthcare provider, a content provider, or any other type of entity that may, at least from time to time, require verification, authentication, and/or auditing of communications device 102 prior to permitting a transaction to take place. Subscriber 205 may operate communications device 102 to initiate a transaction involving client computing resource 225. In response to subscriber 205 attempting to engage in a financial transaction, client computing resource 225 may communicate with identity verifier 228, which may operate to authenticate, verify, and/or audit subscriber 205 operating communications device 102. In the embodiment of FIG. 2, authentication, verification, and/or auditing of subscriber 205 may include identity verifier 228 accessing device database 230, which may include historical records of deterministic events with respect to communications device 102. Such records may represent events that may be regarded by client computing resource 225 as representing particular levels of trustworthiness of subscriber 205. In particular embodiments, client computing resource 225 may assess trustworthiness of subscriber 205 by examining porting records, which may relate to how often subscriber 205 has ported communications device 102, such as to obtain a new subscriber identifier (e.g., mobile telephone number). Client computing resource 225 may assess trustworthiness of subscriber 205 by examining records related to whether subscriber 205 has recently removed/replaced a SIM or eSIM of a communications device. Client computing resource 225 may assess trustworthiness of subscriber 205 by examining occurrences of password resets, such as indicated by transmission of one-time passwords to communications device 102. Client computing resource 225 may assess trustworthiness of subscriber 205 by examining tenure of communications device 102, which may relate to a duration that subscriber 205 has owned, operated, or has otherwise been affiliated device 102. It should be noted that claimed subject matter is intended to embrace additional contributors to a trustworthiness score or trustworthiness measure, virtually without limitation.

In the embodiment of FIG. 2, prior to permitting subscriber 205 to engage in a financial transaction via client computing resource 225, identity verifier 220 may establish or form a secure channel between itself and communications device 102. Thus, as previously alluded to, identity verifier 228 may initiate a browser-based Internet session between the identity verifier and the communications device. Thus, in particular embodiments, in response to communications device 102 transmitting a subscriber identifier, which may comprise, for example, a mobile telephone number, identity verifier 228 may transmit a tailored resource locator (e.g., a specially formulated URL), which may be conveyed to communications device 102 via client computing resource 225, network 130, and cellular transceiver 110. In response to obtaining the URL generated by identity verifier 228, communications device 102 may be directed to initiate a browser-based Internet session directly with identity verifier 228. Although not explicitly depicted in FIG. 2, during a browser-based Internet session, identity verifier 228 may issue an eSIM to communications device 102. In response to obtaining an eSIM from identity verifier 228, a secure channel may be formed between communications device 102 and identity verifier 228. Further, as previously noted herein, formation of a secure channel between communications device 102 and identity verifier 228 may occur without bringing about a change in the communication services carrier providing services to device 102. Accordingly, at least in some instances, an existing communication services carrier may continue to process inbound and outbound telephone calls, inbound and outbound text, and so forth. Thus, at least in particular embodiments, an identity verifier may operate to establish a relationship or correspondence between a subscriber identifier, such as a mobile telephone number, and the identity verifier. Such a relationship or correspondence between a subscriber identifier and an identity verifier may operate to permit encryption, utilizing the eSIM issued to the communications device, of communications between the identity verifier and the communications device.

A secure communications channel formed between communications device 102 and identity verifier 228 may permit the identity verifier to transmit cryptographic security keys (or portions thereof) to device 102 and client computing resource 225. Thus, in particular embodiments, the exchange of such security keys may permit formation of a secure channel between client computing resource and communications device 102. Thus, just to name an example, responsive to client computing resource requesting a digital signature from subscriber 205, client computing resource may securely transmit an electronic document to communications device 102 and may securely obtain a digital signature from subscriber 205 by way of a secure channel between resource 225 and device 102.

Figure 3:
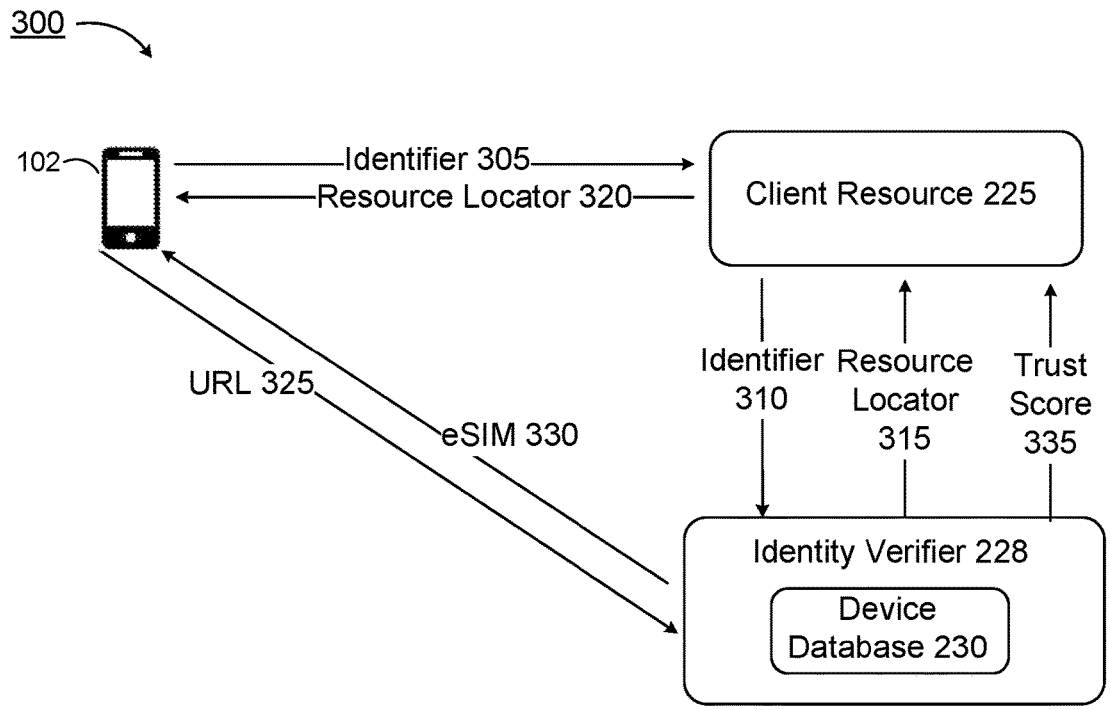
FIG. 3 is a diagram showing message flow among a communications device, a client, and an identity verifier to secure a communications channel between the communications device and the identity verifier, according to an embodiment.

FIG. 3 is a diagram showing message flow among a communications device, a client, and an identity verifier to secure a communications channel between the communications device and the identity verifier, according to an embodiment 300. In the embodiment of FIG. 3, a subscriber, such as subscriber 205 of FIG. 2, may be in possession of and/or be co-located with a communications device, such as communications device 102. The subscriber may wish to engage in a transaction, such as a financial transaction, a transaction to digitally sign one or more documents, a transaction to obtain privileged content (e.g., healthcare records, premium entertainment) etc., utilizing a communications device. Thus, as shown in FIG. 3, a communications device may establish contact with a client computing resource, such as client computing resource 225, operating under the control and/or direction of, for example, a financial institution. In a manner similar to that of FIG. 2, communications device 102, such as at 305, may transmit an identifier, such as an IP address, an alphanumeric combination, or any other type of signal that identifies or associates a communications device as being served or provisioned by a particular communication services carrier. In the embodiment of FIG. 3, communications device 102 may establish a browser-based session with a client computing resource, such as a browser-based session that utilizes a mobile Internet service provider. In the embodiment of FIG. 3, responsive to an attempt by a subscriber to engage in a transaction, a client computing resource may establish contact with an identity verifier, such as identity verifier 228 of FIG. 2, so as to obtain identity verification and/or authorization of a subscriber operating, or at least co-located with, a communications device. Responsive to establishing contact with an identity verifier, a client computing resource may transmit, at 310, the identifier received from communications device 102 to identity verifier 228.

Following receipt of an identifier from client computing resource 225, identity verifier 228 may generate a resource locator, such as a URL, which may be tailored based, at least in part, on an identifier provided by a communications device. A resource locator may be returned to a client computing resource 225, such as at 315. A client computing resource may, in turn, transmit the tailored resource locator to communications device 102, such as at 320. A resource locator may include a session identifier tailored by identity verifier 228. Responsive to receipt of the resource locator, communications device 102 may establish a browser-based session directly with an identity verifier, such as at 325, utilizing a resource locator. The resource locator may correspond to the resource locator transmitted to communications device 102, as in 320. In the embodiment of FIG. 3, in addition to the resource locator being returned to client computing resource 225, identity verifier may obtain one or more parameters that relate to trustworthiness with respect to communications device 102. Such parameters may be expressed as a trust score, which may be determined in response to examining records of historical, deterministic events, such as porting records with respect to communications device 102, recent removal and/or replacement of a SIM or eSIM of a communications device, occurrences of password resets, tenure of communications device 102, for example.

Following receipt of a session identifier from a communications device, identity verifier 228 may issue an eSIM to communications device 102 at 330. Identity verifier 228 may establish a correspondence or a bind between an eSIM issued at 330 to an identifier communications device 102. Accordingly, in particular embodiments, an eSIM issued by identity verifier 228 may represent a unique electronic fingerprint that corresponds to a one or more device-specific identifiers, such as an IMEI, a MSISDN, an IMSI, an ICC ID, or any other identifier that may be utilized to identify a particular communications device to identity verifier 228. Thus, responsive to issuing an eSIM to communications device 102, the eSIM may operate to form a secure, encrypted communications channel between device 102 and identity verifier 228.

In certain embodiments, communications device 102 may communicate with identity verifier 228 responsive to device 102 obtaining or extracting parameters from a unique machine-readable (e.g., optically readable) code, such as a QR code, a one- or two-dimensional barcode, or any other arrangement of optical characters, optical indicators, and so forth. A machine-readable code may correspond to a code extracted in a radiofrequency domain, such as from a radiofrequency identification (RFID) card or a code extracted from a near field communications device, for example. In such instances, a machine-readable code may include parameters that allow communications device 102 to interact with identity verifier 228 without involvement of client computing resource 225.

In the embodiment of FIG. 3, issuance of an eSIM may represent a one-time occurrence, such as during initial stages of a financial transaction. Thus, an eSIM may be repeatedly re-used to conduct additional (subsequent) financial transactions. Further, as previously mentioned, although eSIM encryption may be utilized in securing a channel between a communications device and an identity verifier without a need for subscriber 205 to change communication services providers. A subscriber may thus be able to maintain an existing relationship with a communication services provider to perform inbound and outbound call processing, inbound and outbound text message processing, billing, and other services.

Figure 4:
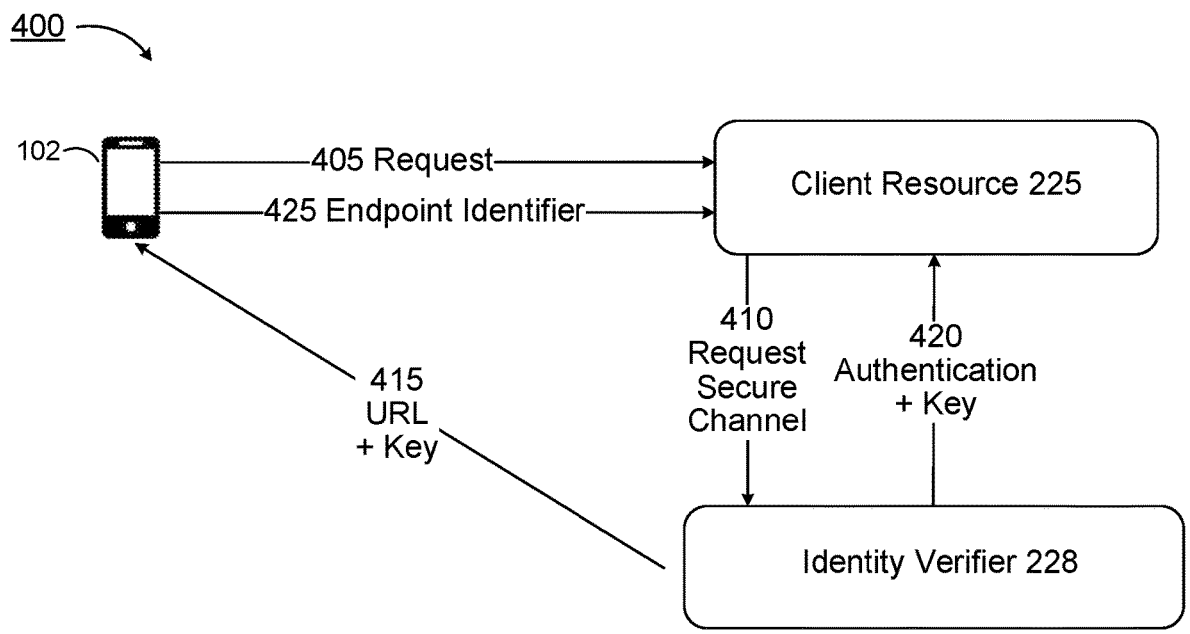
FIG. 4 is a diagram showing message flow among a communications device, a client, and an identity verifier to secure a communications channel between the communications device and the client, according to an embodiment.

FIG. 4 is a diagram showing message flow among a communications device, a client, and an identity verifier to secure a communications channel between the communications device and the client, according to an embodiment 400. The embodiment of FIG. 4 may occur at a time after identity verifier 228 issues an eSIM to communications device 102, such as described in reference to FIG. 3. In particular embodiments, a secure channel between communications device 102 and client computing resource 225 may operate as a virtual private network, so as to permit secure transmission of documents between device 102 and resource 225, although claimed subject matter is intended to embrace formation of networks other than those operating in accordance with virtual private networks.

In the embodiment of FIG. 4, communications device 102 may contact or otherwise request service from client computing resource 225. For example, communications device 102 may contact client computing resource 225 to engage in a financial transaction, obtain and/or sign and the electronic document, or the like. Responsive to communications device 102 contacting client computing resource 225, such as at 405, resource 225 may transmit request 410 to form a secure channel (between device 102 and resource 225) to identity verifier 228. Request 410 may additionally include an endpoint identifier corresponding to communications device 102.

In response to receipt of a request for secure channel and the endpoint identifier of communications device 102, at 415 identity verifier 228 may generate a resource locator (e.g., a URL) for transmission to device 102. The resource locator may allow communications device 102 to establish a browser-based session during which identity verifier 228 may recognize device 102 as corresponding to a known and/or previously authenticated communications device. Recognition of communications device 102 may occur in response to identity verifier 228 determining that the eSIM utilized by device 102 corresponds to an eSIM previously issued by verifier 228 as described, for example, with respect to FIG. 3. 415 may additionally include identity verifier 228 generating and transmitting a key, such as a randomly generated key, or any portion of a key or key pair (e.g., public/private key pair), to communications device 102. At 420, identity verifier 228 may transmit authentication parameters, such as authentication parameters verifying and/or validating communications device 102, to client computing resource 225. Also at 420, identity verifier 228 may transmit a key parameters to client resource 225. In the embodiment of FIG. 4, key parameters transmitted to client computing resource 225 may permit a secure, encrypted communications channel to be formed between communications device 102 and client computing resource 225. Thus, client computing resource 225 and device 102 may conduct secure, encrypted communications without further involvement, for example, from the eSIM issued device 102.

Figure 5:
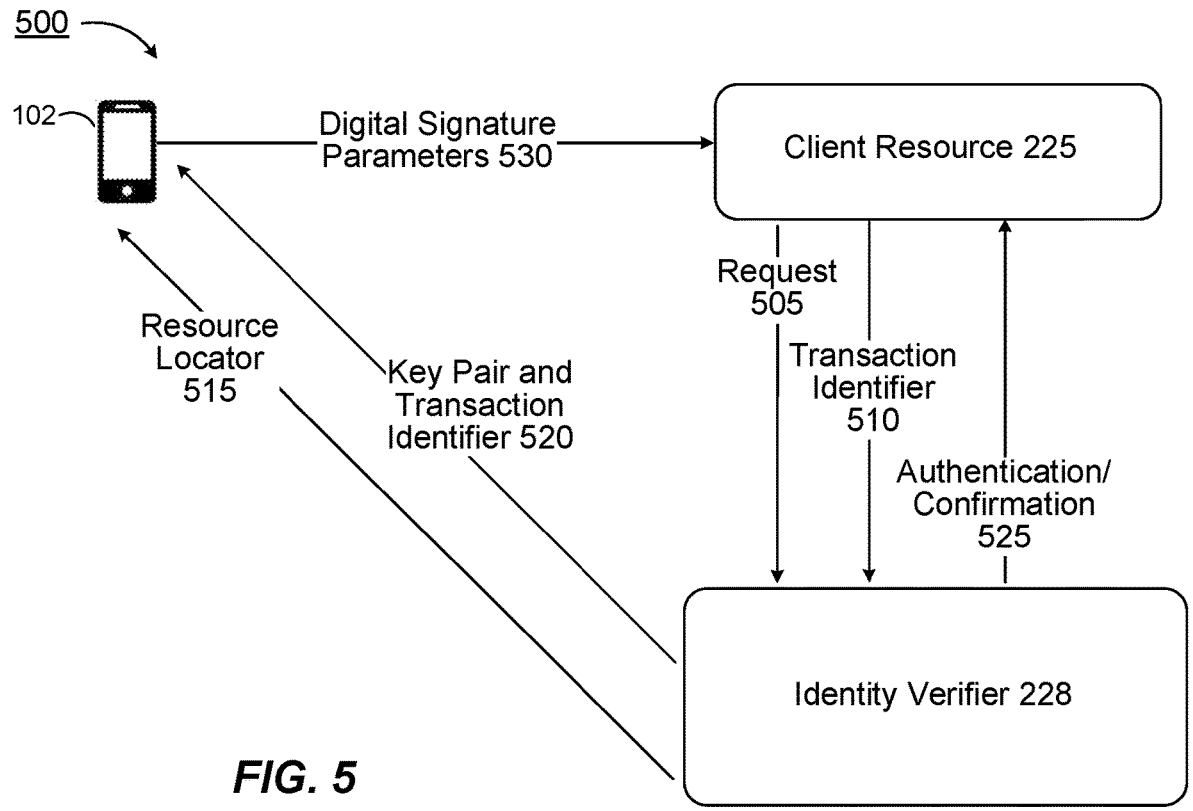
FIG. 5 is a diagram showing message flow among a communications device, a client, and an identity verifier to perform a digital signature operation, according to an embodiment.

FIG. 5 is a diagram showing message flow among a communications device, a client, and an identity verifier to perform a digital signature operation, according to an embodiment 500. The method of FIG. 5 may begin with a client computing resource transmitting at 505 a request to secure a transaction, such as a transaction requiring a digital signature. For example, a digital signature may be effected by forming two halves of a one-time key for a transaction, which may be difficult (or even virtually impossible) to replicate by an unscrupulous party attempting to forge a digital signature. A digital signature may involve creating or forming a signing key, which may be utilized by a communications device, and a confirmation key, which may be utilized by a client computing resource.

At 510, a client computing resource may provide a transaction identifier, such as an identifier that corresponds to a digital signature transaction, to identity verifier 228. At 515, identity verifier 228 may tailor a one-time-use resource locator (e.g., a URL) for use by communications device 102 in establishing a browser-based session with the identity verifier. In the embodiment of FIG. 5, communications during the browser-based session may be encrypted utilizing, for example, the eSIM issued to communications device 102 in accordance with FIG. 3. At 520, responsive to client computing resource 225 identifying communications device 102, such as via an endpoint identifier, or by way of a subscriber identifier (e.g., a mobile telephone number), identity verifier 228 may transmit a signing key of a randomly-generated key pair (e.g., a randomly generated public/private key pair) to communications device 102. At 525, identity verifier 228 may transmit authentication parameters of communications device 102, which may validate the communications device to client computing resource 225. Authentication parameters transmitted to resource 225 may include parameters and/or identification of the eSIM issued to communications device 102, such as described in reference to FIG. 3. At 525, identity verifier 228 may additionally transmit a confirmation key utilized to confirm the signing key transmitted to communications device 102 at 520.

Responsive to receipt of the signing key transmitted at 520, subscriber 205 may then digitally sign a transaction via communications device 102. The signing key may then be returned with a transaction identifier and/or digital signature parameters as indicated at 530 and FIG. 5. Client computing resource 225 may then determine, by way of the confirmation key transmitted from identity verifier 228 to resource 225 at 525, whether the transaction signed by subscriber 205 is valid as well as decrypting the transaction parameters and the transaction identifier transmitted at 530.

It should be noted that in some embodiments, 520 may include transmission of a public key to communications device 102 and transmission of a private key to client computing resource 225 at 525. However, in other embodiments, 520 may include transmission of a private key to communications device 102 and transmission of a public key to client computing resource 225 at 525. Claimed subject matter is intended to embrace distribution of public and private keys utilizing any approach, virtually without limitation.

Figure 6:
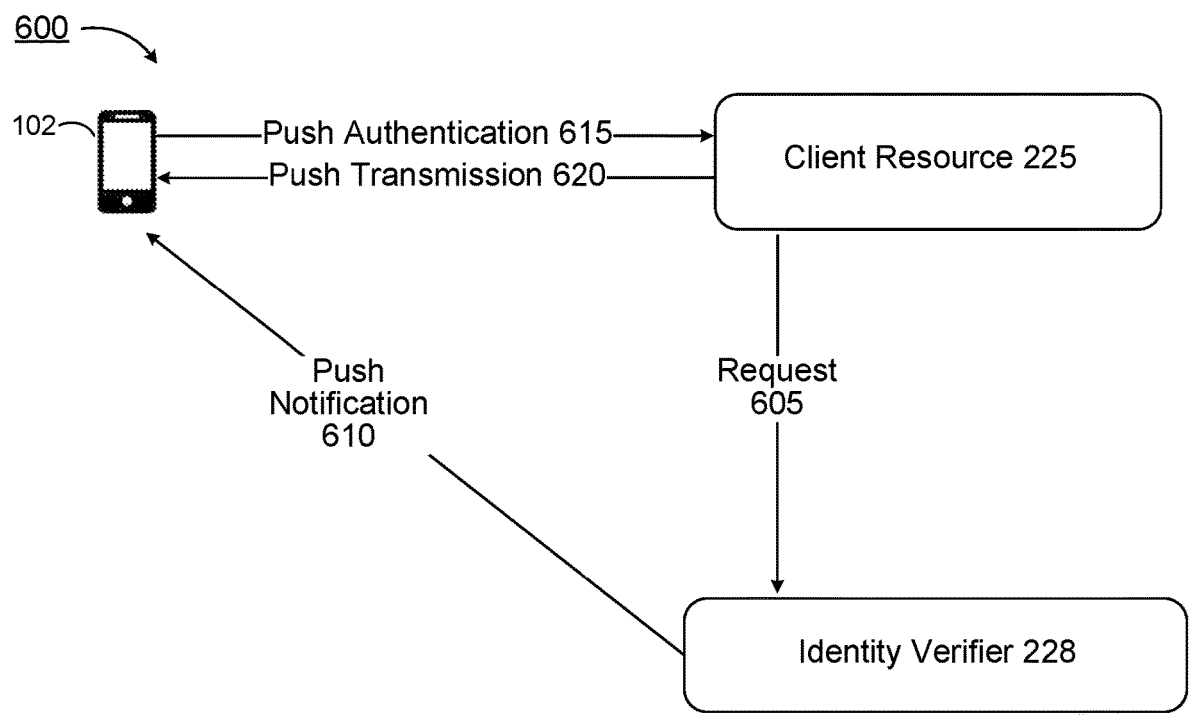
FIG. 6 is a diagram showing message flow among a communications device, a client, and an identity verifier to secure push messages from a client resource to a communications device, according to an embodiment.

FIG. 6 is a diagram showing message flow among a communications device, a client, and an identity verifier to secure push messages from a client resource to a communications device, according to an embodiment 600. As shown in FIG. 6, a process to push a transmission from a client computing resource to a communications device may begin at 605, in which a client computing resource transmits a request that a push message to a communications device be secured. For example, a client computing resource may be attempting to push a one-time password to a communications device, perhaps in response to the communications device indicating that a subscriber password has been forgotten, lost, etc. At 610, identity verifier 228 may transmit a notification to communications device 102 utilizing eSIM encryption, following, for example, issuing an eSIM to the communications device in accordance with the message flow of FIG. 3. Subscriber 205 (of FIG. 2) operating communications device 102 may activate the push one-time password, which may give rise to device 102 transmitting authentication parameters, at 615, to client computing resource 225. In response to client computing resource 225 receiving authentication parameters, resource 225 may transmit the push notification to device 102.

Figure 7:
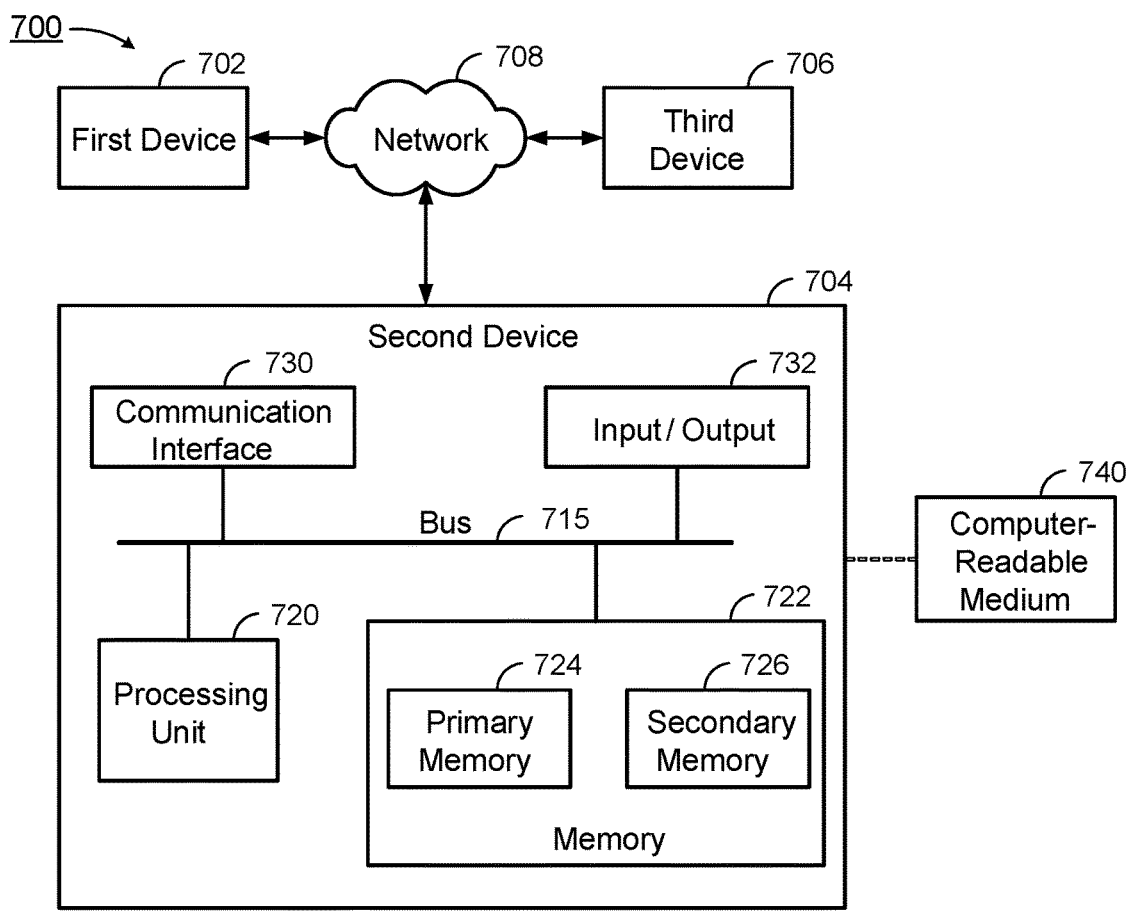
FIG. 7 is a diagram showing a computing environment, according to an embodiment.

FIG. 7 is a diagram showing a computing environment, according to an embodiment 700. In the embodiment of FIG. 7, first and third devices 702 and 706 may be capable of rendering a graphical user interface (GUI) for a network device, such as server device 140 of FIG. 1, so that a subscriber utilizing a communications device (e.g., a mobile communications device) may engage in system use. Device 704 may potentially serve a similar function in this illustration. Likewise, in FIG. 7, computing device 702 ('first device' in FIG. 7) may interface with computing device 704 ('second device' in FIG. 7), which may, for example, also comprise features of a client computing resource and/or a server computing device, in an embodiment. Processor (e.g., processing device) 720 and memory 722, which may comprise primary memory 724 and secondary memory 726, may communicate by way of a communication interface 730, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 704, as depicted in FIG. 7, is merely one example, and claimed subject matter is not limited in scope to this particular example.

In FIG. 7, computing device 702 may provide one or more sources of executable computer instructions in the form of physical states and/or signals (e.g., stored in memory states), for example. Computing device 702 may communicate with computing device 704 by way of a network connection, such as via network 708, for example. As previously mentioned, a connection, while physical, may be virtual while not necessarily being tangible. Although computing device 704 of FIG. 7 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 722 may comprise any non-transitory storage mechanism. Memory 722 may comprise, for example, primary memory 724 and secondary memory 726, additional memory circuits, mechanisms, or combinations thereof may be used. Memory 722 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 722 may comprise one or more articles utilized to store a program of executable computer instructions. For example, processor 720 may fetch executable instructions from memory and proceed to execute the fetched instructions. Memory 722 may also comprise a memory controller for accessing device readable-medium 740 that may carry and/or make accessible digital content, which may include code, and/or instructions, for example, executable by processor 720 and/or some other device, such as a controller, as one example, capable of executing computer instructions, for example. Under direction of processor 720, a non-transitory memory, such as memory cells storing physical states (e.g., memory states), comprising, for example, a program of executable computer instructions, may be executed by processor 720 and able to generate signals to be communicated via a network, for example, as previously described. Generated signals may also be stored in memory, also previously suggested.

Memory 722 may store electronic files and/or electronic documents, such as relating to one or more users, and may also comprise a machine-readable medium that may carry and/or make accessible content, including code and/or instructions, for example, executable by processor 720 and/ or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

Processor 720 may comprise one or more circuits, such as digital circuits, to perform at least a portion of a computing procedure and/or process. By way of example, but not limitation, processor 720 may comprise one or more processors, such as controllers, micro-processors, micro-controllers, application specific integrated circuits, digital signal processors, programmable logic devices, field programmable gate arrays, the like, or any combination thereof. In various implementations and/or embodiments, processor 720 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 7 also illustrates device 704 as including a component 732 operable with input/output devices, and communication bus 715, for example, so that signals and/or states may be appropriately communicated between devices, such as device 704 and an input device and/or device 704 and an output device. A user may make use of an input device, such as a computer mouse, stylus, track ball, keyboard, and/or any other similar device capable of receiving user actions and/or motions as input signals. Likewise, for a device having speech to text capability, a user may speak to generate input signals. Likewise, a user may make use of an output device, such as a display, a printer, etc., and/or any other device capable of providing signals and/or generating stimuli for a user, such as visual stimuli, audio stimuli and/or other similar stimuli.

Figure 8:
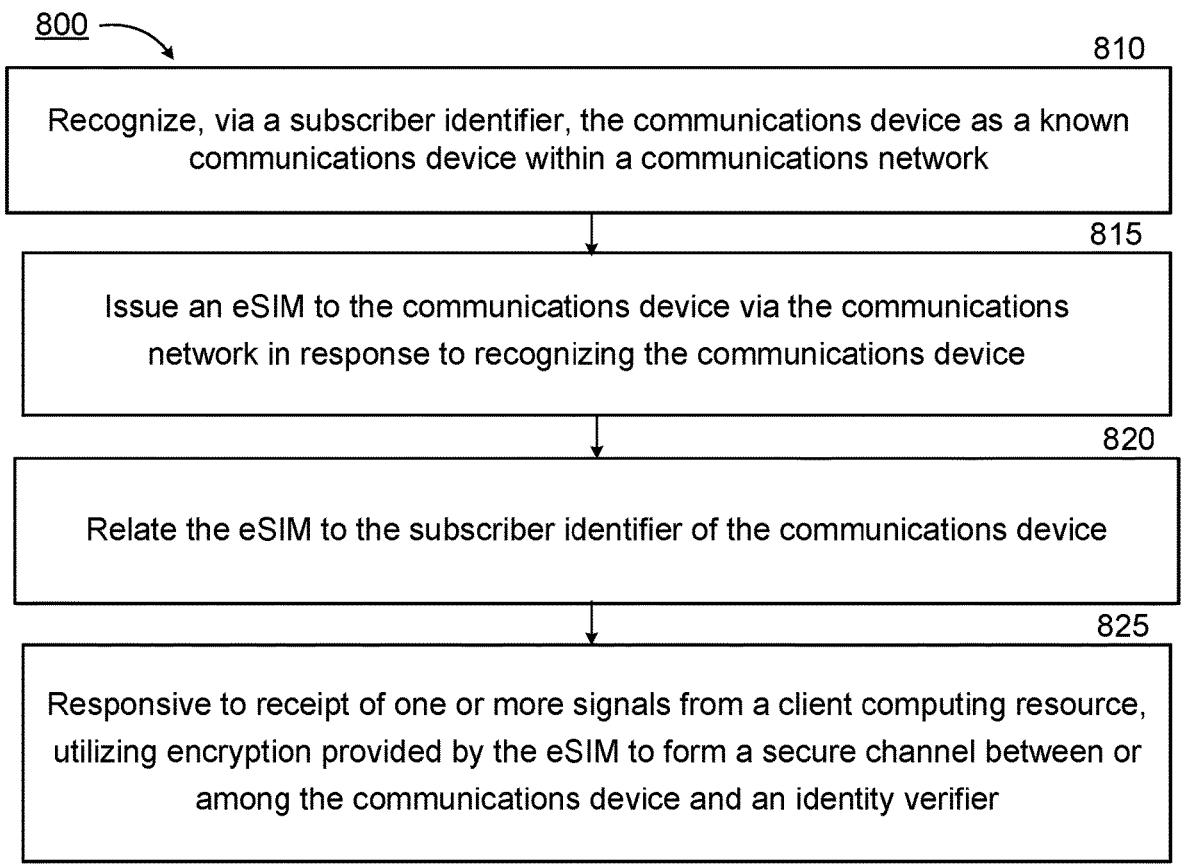
FIG. 8 is a flowchart for a process of forming a secure channel using an eSIM, according to an embodiment.

FIG. 8 is a flowchart for a process of proving possession of a communications device, according to an embodiment (800). The method of FIG. 8 begins at 810, which comprises recognizing, via or utilizing a subscriber identifier, a communications device as a known communications device with in a communications network. The method may continue at 815, which includes issuing and eSIM to the communications device via the communications network in response to recognizing the communications device. The method may continue at 820, which may include relating that eSIM to the subscriber identifier of the communications device. The method may conclude at 825 in which, responsive to receipt of one or more signals from a client computing resource, utilize encryption provided by the eSIM to form a secure channel between or among the communications device and an identity verifier.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall with the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modeled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more communications devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a client computing resource device and/or a communications device, as well as other types of devices, including between wired and/or wireless devices coupled via a wired and/or wireless network, for example.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a communications device and/or a client computing resource device in various embodiments. Network devices capable of operating as a client computing resource, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a communications device, as well as other types of devices, including between wired and/or wireless devices coupled via a wired and/or wireless network, for example, or any combination thereof. It is noted that the terms, server, server device, server computing device, server computing platform and/or similar terms are used interchangeably.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

In the context of the present patent application, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present patent application, the term "transparent," if used with respect to devices of a network, refers to devices communicating via the network in which the devices are able to communicate via one or more intermediate devices, such as one or more intermediate nodes, but without the communicating devices necessarily specifying the one or more intermediate nodes and/or the one or more intermediate devices of the one or more intermediate nodes and/or, thus, may include within the network the devices communicating via the one or more intermediate nodes and/or the one or more intermediate devices of the one or more intermediate nodes, but may engage in signal communications as if such intermediate nodes and/or intermediate devices are not necessarily involved. For example, a router may provide a link and/or connection between otherwise separate and/or independent LANs.

The term electronic file and/or the term electronic document are used throughout this document to refer to a set of stored memory states and/or a set of physical signals associated in a manner so as to thereby, at least logically, form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IoT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). As suggested previously, a computing device and/or a networking device may also have a subscriber identity module (SIM) card, which, for example, may comprise a detachable or embedded smart card that is able to store subscription content of a user, and/or is also able to store a contact list. It is noted, as previously mentioned, that a SIM card may also be electronic in the sense that it may simply be sorted in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a communications device application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method of forming a secure communications channel with a communications device, comprising:
   at an identity verifier computing device, recognizing, via a subscriber identifier of the communications device obtained from a client computing resource, the communications device within a communications network;
   obtaining, at the identity verifier computing device, a request from the communications device, wherein the request comprises a resource locator parameter generated by the identity verifier computing device and provided to the communications device via the client computing resource, wherein the resource locator parameter identifies a first transaction between the communications device and the client computing resource;
   issuing an eSIM from the identity verifier computing device to the communications device via the communications network in response to the request;
   relating the eSIM to the subscriber identifier of the communications device; and
   responsive to receipt at the identity verifier computing device of one or more signals from the client computing resource, utilizing an encryption provided by the eSIM to form the secure communications channel between the communications device and the identity verifier computing device.

2. The method of claim 1, further comprising recognizing the communications device, including the identity verifier computing device accessing one or more memory devices to obtain one or more historical or behavioral parameters corresponding to the communications device.

3. The method of claim 2, wherein the one or more historical or behavioral parameters correspond to a trustworthiness metric of the communications device.

4. The method of claim 1, further comprising:
   receiving, prior to issuing the eSIM from the identity verifier computing device to the communications device, one or more signals generated responsive to the communications device obtaining one or more parameters from a machine-readable code.

5. The method of claim 4, wherein the machine-readable code corresponds to an optically readable code, a code operating in a radiofrequency domain, or a combination thereof.

6. The method of claim 1, further comprising recognizing the communications device, including receiving, at the identity verifier computing device, a mobile telephone number or one or more parameters assigned to the eSIM.

7. The method of claim 1, wherein the secure communications channel corresponds to a wireless fidelity (Wi-Fi) channel.

8. The method of claim 1, further comprising:
transmitting, from the identity verifier computing device, a key and an endpoint identifier to the communications device over the secure communications channel; and
transmitting, to the client computing resource, one or more historical or behavioral parameters corresponding to the communications device and the key.

9. The method of claim 1, further comprising:
transmitting a key and an endpoint identifier from the identity verifier computing device to the communications device over the secure communications channel;
transmitting a first key portion to the communications device; and
transmitting a second key portion to the client computing resource, wherein the first key portion is used by the communications device to digitally sign a transaction, and wherein the second key portion is used by the client computing resource to validate the transaction.

10. The method of claim 1, further comprising:
requesting, via the client computing resource, an eSIM-encrypted push notification for transmitting to the communications device.

11. An apparatus to form a secure communications channel with a communications device, comprising:
at least one processor of an identity verifier computing device coupled to at least one memory device of the identity verifier computing device to:
recognize, via a subscriber identifier of the communications device obtained from a client computing resource, the communications device within a communications network;
obtain, at the identity verifier computing device, a request from the communications device, wherein the request comprises a resource locator parameter generated by the identity verifier computing device and provided to the communications device via the client computing resource, wherein the resource locator parameter to identify a first transaction between the communications device and the client computing resource;
issue an eSIM from the identity verifier computing device to the communications device via the communications network in response to the request;
relate the eSIM to the subscriber identifier of the communications device; and
responsive to receipt at the identity verifier computing device of one or more signals from the client computing resource, utilize an encryption provided by the eSIM to form the secure communications channel between the communications device and the identity verifier computing device.

12. The apparatus of claim 11, wherein the at least one processor coupled to the at least one memory device are additionally to:
access the at least one memory device to obtain one or more historical or behavioral parameters to correspond to the communications device.

13. The apparatus of claim 12, wherein the one or more historical or behavioral parameters are to correspond to a trustworthiness metric of the communications device.

14. The apparatus of claim 11, wherein the at least one processor coupled to the at least one memory device are additionally to:
receive, prior to the issue of the eSIM from the identity verifier computing device to the communications device, one or more signals generated responsive to the communications device obtaining one or more parameters from a machine-readable code.

15. The apparatus of claim 11, wherein the secure communications channel corresponds to a wireless fidelity (Wi-Fi) channel.

16. The apparatus of claim 11, wherein the processor coupled to the at least one memory device are is additionally to:
transmit a key and an endpoint identifier from the identity verifier computing device to the communications device over the secure communications channel; and to
transmit, to the client computing resource, one or more historical or behavioral parameters to correspond to the communications device and the key.

17. The apparatus of claim 11, wherein the processor coupled to the at least one memory device is additionally to:
transmit a key and an endpoint identifier to the communications device over the secure communications channel;
transmit a first key portion to the communications device; and
transmit a second key portion to the client computing resource, wherein the first key portion is to be used by the communications device to digitally sign a transaction, and wherein the second key portion is to be used by the client computing resource to validate the transaction.

18. The apparatus of claim 11, wherein the processor coupled to the at least one memory is additionally to:
request, via the client computing resource, an eSIM-encrypted push notification to transmit to the communications device.

19. An article comprising:
a non-transitory storage medium having instructions stored thereon executable by a special-purpose computing platform to:
at an identity verifier computing device, recognize, via a subscriber identifier of a communications device obtained from a client computing resource, the communications device within a communications network;
obtain, at the identity verifier computing device, a request from the communications device, wherein the request comprises a resource locator parameter generated by the identity verifier computing device and provided to the communications device via the client computing resource, wherein the resource locator parameter to identify a first transaction between the communications device and the client computing resource;
issue an eSIM from the identity verifier computing device to the communications device via the communications network in response to the request;
responsive to receipt at the identity verifier computing device of one or more signals from the client computing resource, utilize an encryption provided by the eSIM to form a secure communications channel between the communications device and the identity verifier computing device, wherein the instructions executable by the special-purpose computing platform are additionally to:

transmit a key and an endpoint identifier to the communications device over the secure communications channel; and to transmit, to the client computing resource, one or more historical or behavioral parameters corresponding to the communications device and the key.

20. The article of claim 19, wherein the instructions executable by the special purpose computing platform are additionally to:

transmit the key and the endpoint identifier to the communications device over the secure communications channel;

transmit a first key portion to the communications device; and transmit a second key portion to the client computing resource, wherein the first key portion is to be used by the communications device to digitally sign a transaction, and wherein the second key portion is to be used by the client computing resource to validate the transaction.

21. The article of claim 19, wherein the instructions executable by the special purpose computing platform are additionally to:

request, via the client computing resource, an eSIM-encrypted push notification to transmit to the communications device.

* * * * *